Patented Apr. 23, 1929.

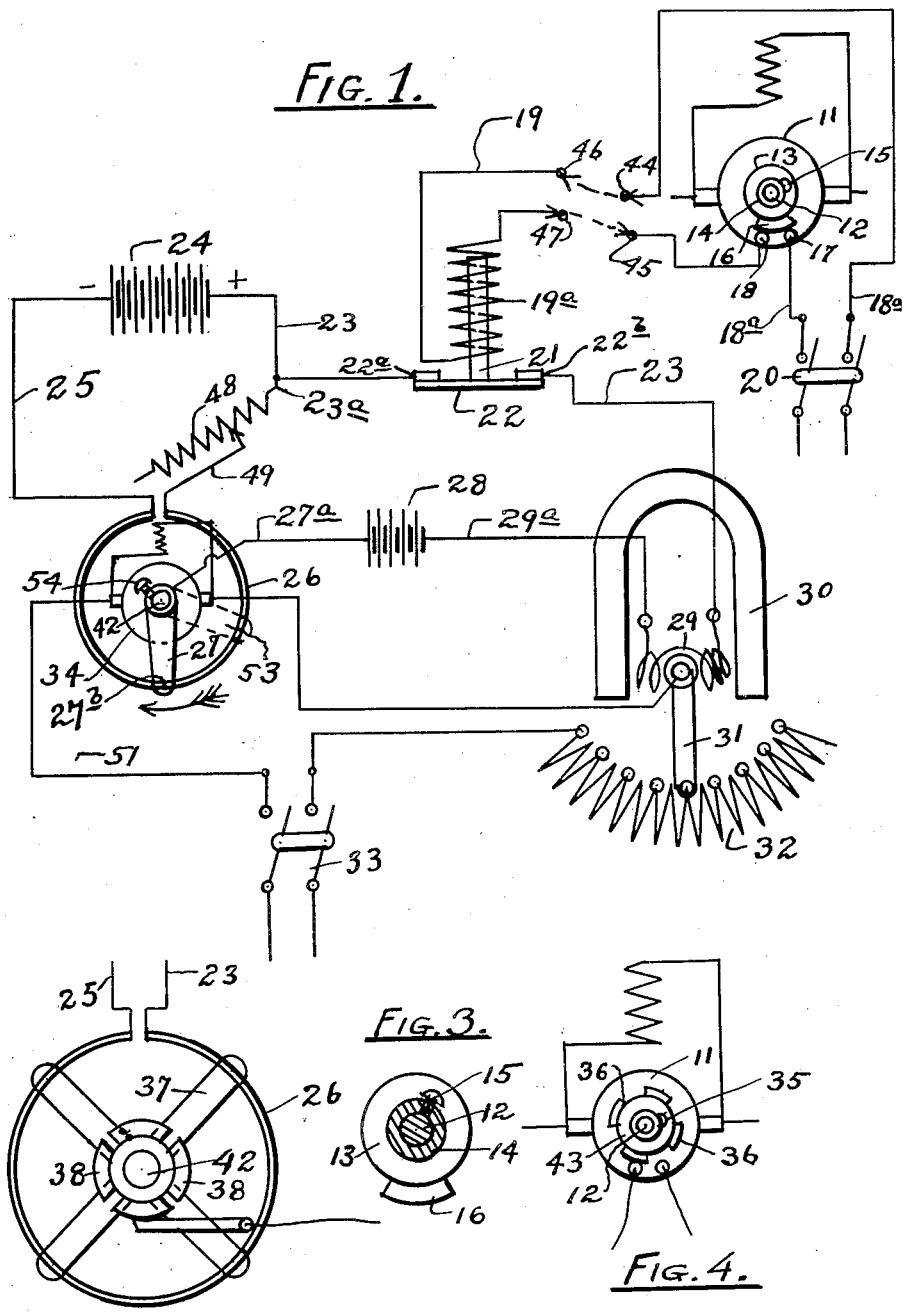

1,710,223

UNITED STATES PATENT OFFICE.

MOSES JACOBSON, OF NEW YORK, N. Y., ASSIGNOR OF ONE-HALF TO WILLIAM A. SCHACHT, OF BROOKLYN, NEW YORK.

METHOD OF AND MEANS FOR ELECTRICALLY CONTROLLING THE SPEED AND PHASE OF DISTANTLY-SITUATED MACHINES AND APPARATUS.

Application filed June 28, 1924. Serial No. 723,059.

My invention relates to improvements in electrical controlling means and it consists in the novel features hereinafter more fully described.

One object of my invention is to synchronize in speed and phase, or only in speed, any machine or apparatus situated at a distance from a controlling machine or apparatus, the two machines or apparatuses being either of the same kind or of different kinds, and they may be connected with each other either by means of electric wires or by radio waves. Another object of my improvement is automatically to change the speed and phase of motion of the controlled machine or apparatus in accordance with a corresponding change in the speed or phase of motion of the controlling machine or apparatus, and thereby in general to control the motion of a distantly situated machine or apparatus by means of a controlling machine or apparatus in such a way as to cause it to run at any required speed and phase, which speed may be either equal to that of the controlling machine or apparatus or it may have any desired ratio thereto.

Some of the specific applications of the above objects are:—

I. To synchronize a motor with a generator situated at a distance therefrom, or vice versa, or two motors, or two generators situated at a distance from each other.

II. To produce any required action in a distantly located machine or apparatus by changing the speed or phase of a moving part thereof.

III. To carry out the operations of frequency changing and other variable operations at a radio receiving station in strict synchronism with similar operations at the radio transmitting station, as may be required in some radio communication systems.

IV. Automatically to regulate a system of clocks from one standard clock either by electric wire or wireless connection.

The above are only a few of the many possible applications of my invention, which I intend to apply to all purposes to which it may be found applicable. Other objects and advantages of my invention will hereinafter appear.

I attain these objects by the electrical controlling means, one form of which with some minor modifications is illustrated, mainly diagrammatically, in the accompanying drawings, which show a specific embodiment of my invention, or by any equivalent or obvious modification of the same.

In the drawings Figure 1 is an assembly, mainly in elevation, of one form of my method of and means for electrically controlling the speed and phase of distantly situated machines and apparatuses.

Figure 2 is a detail of a modification of the contact arm of the potentiometer of the controlled machine or apparatus, which is hereinafter more fully described.

Figure 3 is a detail on a larger scale showing a means for adjusting the position of the periodically moving cam of the controlling machine or apparatus, which is hereinafter described.

Figure 4 is a detail of a modification of the controlling apparatus corresponding to the modification of the controlled apparatus shown in Figure 2.

Similar numerals refer to similar parts throughout the several views.

In the drawings 11 designates an electric motor of a controlling machine or apparatus, which is shown as mounted on a shaft 12, which is shown as having adjustably connected thereto a disc 13 by means of its hub 14 and a screw 15.

The disc 13 is shown as having on the periphery thereof a cam 16, which periodically and intermittently connects in a predetermined way the contacts 17 and 18 of an electric circuit 18ª, which is connected by a switch 20 to a source of electric power. This intermittently energized circuit is shown as broken off at the binding posts 44 and 45 of the controlling apparatus and resumed at the binding posts 46 and 47 of the controlled apparatus, which may be situated at any suitable distance from the controlling apparatus.

The electric energy may be transmitted between said binding posts either through wires or through radio waves by means of any suitable radio apparatus.

Wherever the term, "electric transmitting apparatus" is used hereinafter in the claims, it is meant to designate either a radio transmitting apparatus or a part of an electric circuit at the controlling apparatus; and wherever the term "electric receiving apparatus" is used, it is meant to designate either a radio receiving apparatus or part of an electric circuit at the controlled apparatus, connected by wires with said part of the circuit at the controlling apparatus.

Instead of rigidly mounting the disc 13 with the cam 16 on the shaft of the motor 11, they may be operatively connected to each other in any known manner. Also in place of the mechanism shown in the drawings any other suitable means for interrupting or varying the current in the circuit 18<sup>a</sup> may be employed.

The circuit of the controlled machine or apparatus is controlled by the relay 21, which is placed in the field of the circuit 19—19<sup>a</sup>; this circuit, in the case of the transmission of electric energy by wire, may be the continuation of the circuit 18<sup>a</sup>, and, in the case of the transmission of energy by wireless waves, may be connected to the radio receiving apparatus at 46—47.

When a circuit is flowing through the field windings 19<sup>a</sup> of the relay, the armature 21 of the latter, connecting the contact points 22<sup>a</sup> and 22<sup>b</sup> by means of the metal switch 22, closes the circuit 23, 29.

This circuit is the branch of a potentiometer circuit, well known in the electrical art, as used for the purpose of measuring E. M. F.

The main potentiometer circuit containing the compensating battery 24 and resistance 26 is always closed during the operation of the apparatus; said resistance, which is diagrammatically shown in the drawings as a circular wire, preferably consists of a coil bent into a ring with the ends thereof nearly but not quite brought together, like the potentiometers frequently used in radio sets; but unlike the latter, the sliding contact arm 27 thereof is adapted continually to rotate at a high speed.

The electrical connection with the rotating arm 27 is preferably secured by a brush, similar to the one shown in Figure 2, which slides on a ring mounted on the same shaft as the said contact arm 27.

To this brush and to a fixed point outside of the potentiometer resistance 26 is connected the branch circuit 27, 28, 29, 23, 22, 23, containing the compensated battery 28, which stands in the place of an E. M. F. to be measured by the potentiometer. The compensated battery 28 is inserted into the circuit in such a way, that it produces a current in a direction opposite to the current, which is sent therethrough from the main circuit. As the E. M. F. of the compensating battery 24 is higher than that of the battery 28, preferably nearly twice as high, there is always a certain position of the rotating contact arm 27, near the middle of the resistance 26, when the E. M. F. of battery 28 is just compensated by the drop of potential in the part 24—27<sup>b</sup> of the main potentiometer circuit. At that moment no current will flow through said branch circuit. It is obvious that the currents which will flow in the branch circuit before and after the moment of compensation will have opposite directions, and their intensity will depend upon how far these positions of the contact arm 27 are from the mentioned compensating position. The absolute values of the E. M. F. 24 and 28 may be chosen so high as to give any desired intensity of current for a given small departure from the compensating position.

In the branch circuit 23—27 is inserted an electrical instrument 29, 30, which is substantially a dead beat galvanometer or electrodynamometer, preferably with the characteristics of a ballistic instrument or an oscillograph, but differs from said instruments in that it has no back directing force or a very small one in comparison to the friction, which the moving part has to overcome. Such an instrument, when a short time current impulse passes through it, will give a deflection corresponding in direction and magnitude to that current, but will not be able to return to the zero position after the current will cease to flow, and will remain in the position of the former deflection until a current in the opposite direction or a stronger current in the same direction will pass through the instrument.

To the moving part of this instrument is rigidly or operatively connected an arm 31 of a regulating rheostat 32, which controls the current in the circuit 50, 51, 33, 52 and thereby the speed of the motor 34.

The shaft of the above described contact arm 27 is connected with shaft 42 of the motor 34 either rigidly, forming a continuation thereof, as shown in the drawing, or operatively, through any of the known mechanical means, to revolve at a desired ratio of speeds.

If instead of the motor 34 a nonelectrical machine or apparatus is to be controlled, in place of the controlling rheostat 32 other controlling means, adapted to change the speed of the said controlled machine or apparatus, may be used.

The contact arm 27 on the shaft 42 may be adjusted and fixed in position by means of the screw 54 so that the compensating position of said contact arm when rotating corresponds to a certain phase of the movement to be controlled, for instance to a certain position of the rotor of the motor or to a certain phase of the E. M. F. in a generator, which is connected with the motor. A finer adjustment of the coincidence of the moment of compensation with a certain predetermined phase of the controlled machine can be obtained by means of a rheostat with a sliding contact 48, 49 inserted in the main potentiometer circuit.

In a similar way the moment of closing the circuits 18ᵃ, 17, 18, 45 in the controlling apparatus can be made to coincide with a predetermined phase of any part of said apparatus by adjusting the angular position of a disc 13, having thereon a cam 16 (see Fig. 3), on the shaft 12 by means of the screw 15.

The operation of my invention as shown in the drawings is as follows:—

When no energy is coming in from the controlling apparatus, the branch circuit 23—27ᵇ is disconnected at 22ᵃ, 22ᵇ, the electric apparatus 29, 30 is not deflected and the speed controlling means 31, 32 remain in their initial position. If the speed of the rotating cam 16, of the controlling apparatus is equal to the speed of the controlled motor (or if the ratio of the respective speeds is a whole number) and the predetermined phase of the controlled apparatus differs in time from the predetermined phase of the controlling apparatus only in so much as is necessary for the energy to be transmitted through the space between the two apparatuses, then the moments of reception of energy and the closing of the branch circuit by the relay 19ᵃ, 21 will coincide with the moments of the rotating contact arm 27 passing through the compensating position. In this case, although the branch circuit is closed, no current will flow therein and the electric instrument 29, 30 and the speed changing means will remain in their position. But, if the reception of energy closing the branch circuit occurs earlier, say, in such a moment, when the rotating arm is in position 53, shown in Figure 1 by dotted lines, then a current will flow through said branch circuit and the electric apparatus. This current obviously will be the stronger, the more the position 53 differs from the compensating position 27. The connections of the electric instrument 29—30 to the circuit and speed controller 31, 32 are made in such a way, that in the described case, when the phase of the energy transmitted from the controlling means is in advance of the chosen phase of the controlled motor, the current will cause an increase in speed of the controlled motor. The incoming energy will now with every revolution nearer and nearer to the compensating position, and after coinciding or nearly coinciding with that position will begin to find the said contact arm 27 in positions further and further away on the other side of its compensating position. But when the branch circuit is closed by the received energy while the contact arm is on the left side of the compensating position in Fig. 1, a current opposite in direction to the former is sent through the branch circuit. The more the position, occupied by the contact arm in the moments of reception of energy, will depart from the compensating position the stronger will be this current. After a few revolutions of the arm 27 (or one revolution when the batteries are strong enough and the electrical apparatus sensitive enough) this current will be able to actuate the electric instrument 29—30 and the speed controller 31—32 in a direction opposite to the former action, thus again reducing the speed, but leaving it obviously somewhat increased comparatively to the initial speed. After a few revolutions the difference in speed between the controlling and controlled apparatuses will again cause a reduction of speed, and so on, till the speed will be again reduced to the previous magnitude but the respective phases of the incoming of energy and passing of the contact arm 27 through the compensation position occurring now synchronically.

It is thus obvious that the action of the apparatus will always be such, as automatically to bring the passing of the contact arm 27 through the compensating position into synchronism with the incoming of energy from the controlling apparatus, this being the only stable condition of the whole apparatus.

Any accidental change in the speed of the controlled apparatus will immediately cause a departure from the described synchronism of phases. Restoring the synchronism of said phases, the apparatus obviously will also regain the previous speed.

When a change in the phase of transmitting the energy from the controlling apparatus sufficient to actuate the described controlling means will be produced, the controlled apparatus will in a few revolutions throw itself into synchronism with the controlling apparatus in the described way.

When a change in speed is produced in the controlling apparatus, the incoming of energy from said apparatus will depart from the moments of compensating more and more with every revolution, and therefore, no matter how small the change in speed may be, it will after a number of revolutions produce a difference in phases large enough to actuate the speed changing means in the described way and to cause the controlled apparatus to follow the change in speed of the controlling apparatus. When the speed of the controlled apparatus is then not yet equal to the new speed of the controlling apparatus, there will after a number of revolutions again accumulate such a difference in phases as is necessary for the minimum action of the described controlling means, and so on, till the speeds of both apparatuses will be exactly equal.

For controlling only the speed obviously no adjustment of the cam in the controlling apparatus and of the contact arm in the controlling apparatus is necessary.

The controlling action by the described device is substantially carried out once during each revolution (or in general during each period of motion). In the meantime deviations of speed and phase may occur. When it is required to make the periods of time between the actual controlling shorter and thereby to obtain a higher degree of uniformity in the motion, the modification of my apparatus shown diagrammatically in Figures 2 and 4 may be used. Instead of the one contact arm 27 a plurality of contact arms may be provided, for example four, as shown in the drawings. To connect everyone of these contact arms with the potentiometer branch circuit only for a part of a revolution, the above described contact ring is now split into as many sectors isolated from each other and from the shaft as there are contact arms, every sector being connected only with one contact arm. In the controlling apparatus the same number of cams may be provided, as there are contact arms in the controlling apparatus. But the ratio between the number of cams and contact arms may also be any whole number, other than one, when it is desired to run the controlled machine at a speed, different from that of the controlling apparatus, but at a required ratio thereto.

In the branch circuit 27—29—23 of the described potentimeter circuit the battery 28 may be omitted, the electrical instrument 29, 30 then being actuated by the deviation of the current from a certain normal value. To secure the necessary varying E. M. F. other circuits and other means, than the described potentimeter circuit with the rotating contact arms, may be used; and in general I do not restrict myself to the particular apparatus and mechanisms here shown, but various changes and modifications by those skilled in the art may be made in the particular apparatus shown and described herein, without departing from the spirit of my invention or the scope of the following claims. Parts of my invention may also be used without the other parts.

What I claim is:

1. In a system for electrically controlling distantly situated machines and apparatuses a controlling apparatus comprising a means for producing electrical impulses synchronized with a predetermined phase of said controlling apparatus, means for transmitting said impulses to the controlled machine or apparatus, a periodically varying part of said machine or apparatus, a source of variable E. M. F., operative connections between said part and said source, whereby said E. M. F. is controlled in its period and phase by said part, and a relay, to be operated by said electrical impulses and adapted to close the output circuit from said E. M. F. for the duration of said impulses.

2. In a system for electrically controlling distantly situated machines and apparatuses a controlling apparatus comprising a means for producing electrical impulses synchronized with a predetermined phase of said controlling apparatus, means for transmitting said impulses to the controlled machine or apparatus, a periodically varying part of said machine or apparatus, a source of variable E. M. F., operative connections between said part and said source, whereby said E. M. F. is controlled in its period and phase by said part, a relay, operated by said electrical impulses and adapted to close the output circuit from said E. M. F. for the duration of said impulses, a means for varying the speed of the controlled machine or apparatus, said means being adapted to be operated by electrical currents of short duration and electrical connections through which said electrical currents control said speed-varying means to maintain a predetermined phase relation between the controlled and the controlling apparatuses.

3. In a system for controlling distantly situated machines and apparatuses, a controlling apparatus comprising a means for producing electrical impulses synchronized with a predetermined phase of said controlling apparatus, means for transmitting said impulses to the machine or apparatus, which is to be controlled, a relay, to be operated by said impulses, one or more periodically varying parts of the controlled machine or apparatus, means for controlling the speed of said parts, means for operating said speed controlling means by means of electrical currents of short duration, a source of variable E. M. F., operative connections between said source and one of said parts and circuit connections between said source of E. M. F., the secondary of said relay and the said means for operating said speed controlling means, whereby electrical currents are sent through said operating means, said currents being proportional in intensity to the time lag between said impulses and the zero phase of said E. M. F.

4. In a system for electrically controlling distantly situated machines and apparatuses a controlling device, comprising means for producing electrical impulses of a desired period and duration, means for transmitting said impulses over a distance and a controlled apparatus comprising means for receiving the impulses transmitted from the controlling device said receiving means including a relay, a local circuit closed by said relay only for the interval of time when an impulse is received, said local circuit containing a variable E. M. F. operatively connected with a moving part of the machine or apparatus, which is to be controlled and varying in a desired relation of period or phase to said moving part, an electrical instrument with a part adapted to be deflected only when a current passes therethrough and in accordance with the intensity of said current and means for controlling the speed of the controlled apparatus, said controlling means being so connected with the deflecting part of said electric instrument as to decrease the speed of said member when said local circuit is closed by the relay before the current in said instrument passes through the zero phase and increase it when closed after the current in said electric instrument passes the zero phase, thereby bringing a predetermined phase of said moving member into synchronism with the incoming of impulses from the controlling apparatus.

5. In a means for electrically controlling distantly situated machines and apparatuses a controlling device, comprising means for producing electrical impulses of a desired period and duration, means for transmitting said impulses over a distance and a controlled machine or apparatus, comprising one or more periodically moving members, means for controlling the speed of said members, an electrical instrument with a movable part thereon, said part being adapted to be deflected by an electrical current passing through said instrument, the deflection being in proportion to the intensity of the current, an operative connection between said part and said speed controlling means, an electric circuit, comprising a source of D. C., a relay, actuated by said impulses, transmitted from the controlling device and a rheostat with a sliding contact, a driving connection between said sliding contact and one of said moving members, to move the former in a desired relation of speed to the latter, and electrical connections between said electrical instrument, the said sliding contact and one of the terminals of said rheostat.

6. In a means for controlling distantly situated machines and apparatuses a controlling device, comprising means for producing electrical impulses of a desired period and duration, means for transmitting said impulses over a distance, and a controlled machine or apparatus, comprising one or more periodically moving members, means for controlling the speed of said members, an electrical instrument with a movable part thereon, said part being adapted to be deflected by a current passing through said instrument in proportion to the intensity of said current, an operative connection between said part and said speed controlling means, an electric circuit comprising a source of D. C. and a rheostat with a sliding contact, a driving connection between said sliding contact and one of said moving members, to move the former in a desired relation of speed to the latter, a relay, actuated by said electric impulses, a second source of D. C. and electrical connections between said sliding contact, the secondary of said relay, said second source of D. C., the said electrical instrument and one of the terminals of said rheostat.

7. In a means for controlling distantly situated machines and apparatuses a controlling device, comprising a source of electrical current, an electric circuit, a revolvable current interrupter in said circuit, to produce electrical current impulses of a desired period and duration, and means for revolving said interrupter at a desired speed, means for transmitting said impulses over a distance, and a controlled machine or apparatus comprising a motor, a speed controller for said motor, an electric instrument consisting of a means for producing a magnetic field and a part adapted to be moved by said magnetic field in proportion to a current impulse, passing through the instrument, operative connections between said part of the electric instrument and said speed controller, an electric circuit comprising a source of D. C., a relay actuated by said electric impulses from the controlling device and a rheostat with a sliding contact, a driving connection from said motor to said sliding contact and electrical circuit connections between said sliding contact, said electrical instrument and a fixed point of said rheostat.

8. In a means for controlling distantly situated machines and apparatuses a controlling device comprising a motor, a rotatable disc with one or more electro-conductive cams, a driving connection from said motor to said disc, two stationary contacts, arranged to be conductively connected with each other by said cams, and an electric circuit, containing a source of electrical current and said contacts, and being alternately closed and opened by said cams on the said rotating discs, whereby electrical current impulses of a desired duration and period may be produced, means for transmitting said impulses over a distance, and a controlled machine or apparatus comprising a motor, a speed controller for said motor, an electric instrument consisting of a means for producing a magnetic field and a part adapted to be moved by said magnetic field in proportion to a current impulse, passing through said instrument, an operative connection between said part of the electric instrument and the said speed controller, an electric circuit, comprising a source of D. C. and a rheostat, a contact arm, adapted to slide with one of its ends over said rheostat, a contact piece on the other end of said contact arm, a stationary brush, arranged to be continuously in contact with said piece of the contact arm, a driving connection from said motor of the controlled apparatus to the said sliding contact arm, a relay actuated by said current impulses from the controlling device, a second source of D. C. and electrical circuit connections between said brush, the secondary of said relay, said second source of D. C., the said electric instrument and one of the terminals of said rheostat.

9. In a means for controlling distantly situated machines and apparatuses a controlling device, comprising a motor, a rotatable disc with one or more electro-conductive cams, a driving connection from said motor to said disc, and an electric circuit, containing a source of electric current, and two stationary contacts, arranged to be alternately connected and disconnected by said cams, when said discs are rotated by said motor, whereby electric current impulses of a desired period and duration may be produced, means, for transmitting said impulses over a distance, and a controlled machine or apparatus, comprising a motor, a speed controller for said motor, an electric instrument consisting of a means for producing a magnetic field and a part, adapted to be moved by said field in proportion to a current impulse passing through said instrument, an operative connection between said part of the electric instrument and said speed controller, an electric circuit, comprising a source of D. C. and a ring-shaped rheostat, a rotatable shaft situated along the axis of said rheostat, a plurality of contact arms mounted on said shaft and adapted to slide with one of their ends on said rheostat, a plurality of insulated metallic segments on said shaft, connecting each to one of said contact arms, a stationary brush, arranged to slide on said segments, driving connections from said motor of the controlled apparatus to said shaft, a relay actuated by said electric impulses from the controlling device, a second source of D. C. and electric circuit connections between said brush, the secondary of said relay, said second source of D. C., the said electric instrument and one of the terminals of said rheostat.

MOSES JACOBSON.